(12) United States Patent
Zhou

(10) Patent No.: US 11,635,149 B2
(45) Date of Patent: Apr. 25, 2023

(54) FLOW CONTROL DEVICE

(71) Applicants: Xiamen Water Nymph Sanitary Technology Co., Ltd., Xiamen (CN); Huaqiang Zhou, Xiamen (CN)

(72) Inventor: Huaqiang Zhou, Xiamen (CN)

(73) Assignees: Xiamen Water Nymph Sanitary Technology Co., Ltd., Xiamen (CN); Huaqiang Zhou, Xiamen (CN)

( * ) Notice: Subject to any disclaimer, the term of this patent is extended or adjusted under 35 U.S.C. 154(b) by 252 days.

(21) Appl. No.: 17/163,021

(22) Filed: Jan. 29, 2021

(65) Prior Publication Data

US 2021/0148472 A1    May 20, 2021

(30) Foreign Application Priority Data

Nov. 18, 2020  (CN) .......................... 202011295052.8

(51) Int. Cl.
*F16K 11/07* (2006.01)
*E03C 1/08* (2006.01)
*F16K 11/078* (2006.01)
*E03C 1/084* (2006.01)

(52) U.S. Cl.
CPC ............ *F16K 11/078* (2013.01); *E03C 1/084* (2013.01)

(58) Field of Classification Search
CPC ............................... F16K 11/078; E03C 1/084
See application file for complete search history.

(56) References Cited

U.S. PATENT DOCUMENTS 10,472,808 B2 * 11/2019 Hoogendoorn ..... F16K 11/0787
2022/0325809 A1 * 10/2022 Qiu ....................... F16K 31/605

FOREIGN PATENT DOCUMENTS

DE            20302759 U1 *  5/2003  ............ F16K 11/044

* cited by examiner

*Primary Examiner* — Kevin R Barss
(74) *Attorney, Agent, or Firm* — Westbridge IP LLC

(57) ABSTRACT

The invention relates to the field of bath products, and provides a flow control device. The flow control device comprises a movable rod capable of reciprocating to switch water into different outlet passages, wherein a flow control part circumferentially extends and protrudes out of the movable rod, and the movable rod rotates to drive the flow control part to rotate to control the flow in the corresponding outlet passage. During use, the movable rod is pressed to control the switching the outlet passages, and users can select the position where water is discharged as required, for example, water is discharged upwards or downwards. Moreover, the movable rod rotates to drive the flow control part to rotate to flexibly control the flow of a certain outlet, such as the upward outlet flow, to facilitate daily washing of the users.

13 Claims, 13 Drawing Sheets

E-E

F-F

H-H

FLOW CONTROL DEVICE

CROSS-REFERENCE TO RELATED APPLICATIONS

The application claims priority to Chinese patent application CN 202011295052.8, filed on Nov. 18, 2020, the entire contents of which are incorporated herein by reference.

TECHNICAL FIELD

The invention relates to the field of bath products, in particular to a flow control device.

BACKGROUND

Most faucets in the prior art have a multi-passage switching function, but products capable of controlling the water flow in a specific passage are uncommon. Chinese Utility Model Patent Publication No. CN 205036896 U provides a press-type water diversion device, wherein a radial inlet, a radial upward outlet and a radial downward outlet are formed in the side wall of a device body, a switch valve is arranged in an inner cavity of the device body, a press mechanism drives a valve element to reciprocate along the axis of the switch valve based on the principle of automatic ball-point pens, an upper outlet cavity and a lower outlet cavity are formed between the outer wall of the valve element and the inner wall of the switch valve, flanges located between the upper outlet cavity and the lower outlet cavity separately open or close the upper outlet cavity and the lower outlet cavity on the left and right side and are communicated with corresponding water outlets to switch outlet passages. However, the water division device cannot control the outlet flow of a certain water outlet and cannot switch the passages and control the water flow simultaneously in the same operation state. On a specific occasion, for example when a faucet with an upward water spray structure is used, users have to additionally operate a faucet switch to increase the upward outlet flow for rinsing mouths and washing faces, so the operation is inconvenient.

SUMMARY

The technical issue to be settled by the invention is to provide a flow control device which can move to switch passages and can also rotate to control the flow.

The technical solution adopted by the invention to settle the aforesaid technical issue is as follows: a flow control device comprises a movable rod which is able to reciprocate to switch water into different outlet passages, wherein a flow control part circumferentially extends and protrudes out of the movable rod, and the movable rod rotates to drive the flow control part to rotate to control the flow in the corresponding outlet passage.

The invention has the following beneficial effects: during use, the movable rod is pressed to control the switching of the outlet passages, and users can select the position where water is discharged as required, for example, water is discharged upwards or downwards. Moreover, the movable rod rotates to drive the flow control part to rotate to flexibly control the flow of a certain outlet, and particularly for a device with an upward water outlet structure, the outlet flow can be controlled to facilitate daily washing of the users.

DETAILED DESCRIPTION OF THE EMBODIMENTS

Figure 1:
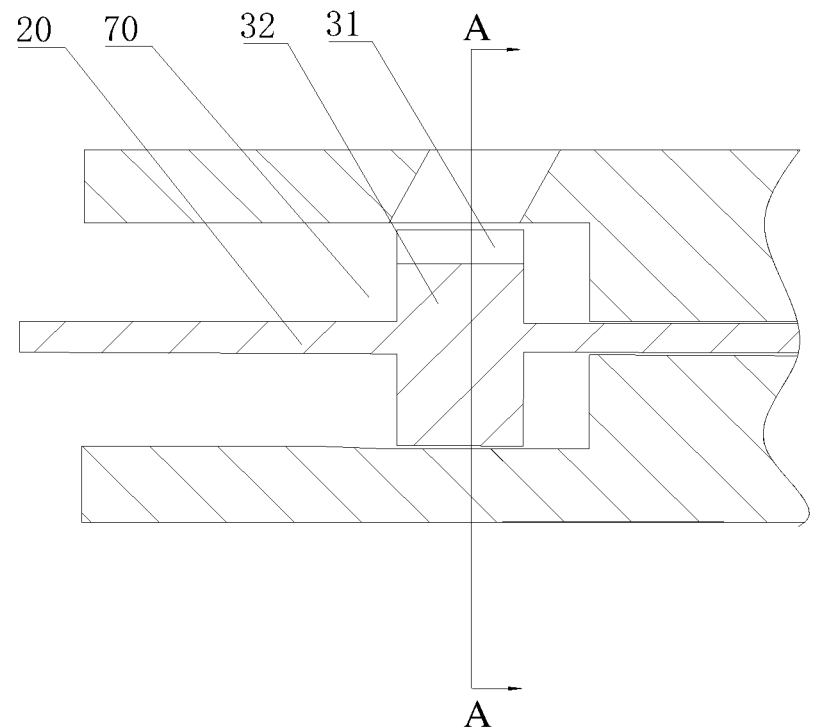
FIG. 1 is a structure view of a flow control device in the case of the maximum outlet flow in an outlet passage in Embodiment 1 of the invention.

The technical contents, purposes and effects of the invention will be expounded below in conjunction with the implementations and accompanying drawings.

The invention provides a flow control device comprising a movable rod capable of reciprocating to switch water into different outlet passages, a flow control part circumferentially extends and protrudes out of the movable rod, and the movable rod rotates to drive the flow control part to rotate to control the flow in the corresponding outlet passage.

From the above description, the flow control device has the following beneficial effects: during use, the movable rod is pressed to control the switching of the outlet passages, and users can select the position where water is discharged as required, for example, water is discharged upwards or downwards. Moreover, the movable rod rotates to drive the flow control part to rotate to flexibly control the flow of a certain outlet, and particularly for a device with an upward water outlet structure, the outlet flow can be controlled to facilitate daily washing of the users.

Furthermore, in the flow control device, the flow control part comprises a control knob circumferentially extending and protruding out of the movable rod, and the circumferential surface of the control knob is formed with a notch and faces and seals the corresponding outlet passage.

From the above description, the control knob is arranged on the movable rod and is formed with the notch, the circumferential surface of the control knob faces and seals the corresponding outlet passage, and water flows into the outlet passage, sealed by the circumferential surface of the control knob, via the notch; when the control knob is rotated to make the notch face the corresponding outlet passage, water normally flows through the outlet passage; when the control knob is further rotated, the space between the notch and the corresponding outlet passage is reduced, the circumferential surface of the control knob gradually seals the corresponding outlet passage, and the water flow in the outlet passage decreases gradually.

Furthermore, in the flow control device, the flow control part comprises a control knob circumferentially extending and protruding out of the movable rod, the circumferential surface of the control knob is formed with a notch and faces and seals the corresponding outlet passage, and a notch plug is arranged on the side wall of each outlet passage.

From the above description, the control knob is arranged on the movable rod and is formed with the notch, and the circumferential surface of the control knob faces and seals the corresponding outlet passage, together with the notch plug fixedly arranged on the side wall of the outlet passage, and water flows into the outlet passage, sealed by the circumferential surface of the control knob, via the notch; when the control knob is rotated to make the notch not sealed by the notch plug, water normally flows through the outlet passage; then the control knob is further rotated, the notch gradually moves close to the notch plug, the space between the notch and the corresponding outlet passage is reduced, the circumferential surface of the control knob gradually seals the corresponding outlet passage, and the water flow in the outlet passage decreases gradually.

Furthermore, in the flow control device, the diameter of the control knob decreases gradually in the circumferential direction to cover a perimeter corresponding to a central angle of 90° and then increases gradually to cover a perimeter corresponding to a central angle of 90°.

From the above description, the diameter of the control knob decreases gradually in the circumferential direction and then increases gradually, so that the control knob has two narrow and long ends and two flat and wide ends. When the circumferential surface of the control knob faces and seals the corresponding outlet passage, the narrow and long ends of the control knob are used as sealing ends, and the flat and wide ends of the control knob are used as circulating ends. That is, when the control knob is rotated, the flat and wide ends face the corresponding the outlet passages, at this moment, the space between the outlet passage and the control knob are the largest, and the outlet flow in the outlet passage is maximized; when the control knob is further rotated, the narrow and long ends gradually face the outlet passage, the space between the outlet passage and the control knob is reduced, and the outlet flow in the outlet passage decreases.

When the circumferential surface of the control knob faces and seals the corresponding outlet passage, together with the notch plug fixedly arranged on the side wall of the outlet passage, the narrow and long ends of the control knob are used as sealing ends, and the flat and wide ends of the control knob are used as circulating ends. That is, when the control knob is rotated, the maximum diameter of the flat and wide ends is parallel to the end plug, at this moment, the space between the outlet passage and the control knob is the largest, the area, sealed by the notch plug and the control knob, of the outlet passage is the smallest, and the outlet flow in the outlet passage is maximized; when the control knob is further rotated, the narrow and long ends rotate slowly, the contact area between the narrow and long ends and the notch plug is reduced, the area, sealed by the notch plug and the circumferential surface of the control knob, is enlarged gradually, and the outlet flow in the outlet passage decreases.

Furthermore, in the flow control device, two notches are symmetrically formed in the control knob, and the section of each notch in the axial direction of the control knob is of an L shape.

From the above description, the two notches are symmetrically arranged, so that the situation where the outlet flow is too small or water cannot be discharged via one notch due to limescale accumulated in the notch after long-term use is prevented. When the control knob is rotated to make the L-shaped notches face the corresponding outlet passage, the space between the outlet passage and the control knob is the largest, and the outlet flow of the outlet passage is maximized; when the control knob is further rotated to make the notch-free portion of the circumferential surface of the control knob gradually seals the corresponding outlet passage, and the outlet flow in the outlet passage decreases.

Furthermore, in the flow control device, the movable rod comprises a switch knob circumferentially extending and protruding out of the movable rod, and the switch knob reciprocates to alternately seal different outlet passages.

From the above description, the switch knob circumferentially extending and protruding out the movable part reciprocates to alternately seal the outlet passages.

Furthermore, in the flow control device, a groove surrounding the switch knob in the axial direction is formed in the circumferential surface of the switch knob, and a sealing rubber ring is arranged in the groove.

From the above description, the groove is formed in the circumferential surface of the switch knob, and the sealing rubber ring is arranged in the groove and can move to seal different outlet passages.

Furthermore, the flow control device further comprises an inlet passage and a division cavity, the outlet passages include a first passage and a second passage, and the inlet passage is communicated with the first passage and the second passage through the division cavity.

A first passage inlet communicated with the first passage and a second passage inlet communicated with the second passage are formed in the division cavity and are opposite to each other.

The flow control device further comprises a switch spring, and the switch knob is arranged in the middle of the movable rod.

One end of the movable rod is a press end, and the other end of the movable rod is a holding end; a first accommodating cavity for accommodating the press end is formed in an end, close to the first passage inlet, of the first passage;

a second accommodating cavity for accommodating the holding end is formed in an end, close to the second passage inlet, of the second passage.

The switch spring is disposed around the holding end of the movable rod, one end of the switch spring abuts against the switch knob, and the other end of the switch spring abuts against the side wall of the second accommodating cavity.

From the above description, when the press end is not pressed, the switch spring is in a released state, the sealing rubber ring on the switch knob is attached to the edge of an inlet in an end away from the spring, the second passage is closed, and the inlet passage is communicated with the first passage. When the press end is pressed, the switch spring is compressed, the sealing rubber ring on the switch knob is attached to the edge of an inlet in the end close to the switch spring, the first passage is closed, and the second passage is communicated with the inlet passage. When the passage is full of water, a reactive force will be applied to the switch knob supporting the switch spring to prevent the switch spring from being released, and thus, the switch spring is kept in the compressed state. When water is cut off, the switch spring is released.

Furthermore, in the flow control device, the first passage comprises an upward water spray channel opposite to the gravity direction.

From the above description, during user, users can switch water into the water spray channel as required, such as for washing faces and rinsing mouths, to allow water to be sprayed upwards through the water spray channel.

Furthermore, in the flow control device, a multifunctional aerator is arranged at the tail end of the second passage.

From the above description, the aerator is arranged at the tail end of the first passage, so that the water discharge form can be selected. For example, multifunctional aerators on the present market can discharge needle-shaped water, bubble water, water mist and the like.

Embodiment 1

As shown in FIG. 1, Embodiment 1 provides a flow control device which comprises a movable rod 20, a flow control part 30 and outlet passages 70.

The movable rod 20 is arranged in one outlet passage 70 and is able to move forward or backward and rotate in the outlet passage 70. The movable rod 20 may be the valve element mentioned in the description of the related art, and a sealing element of the outlet passage 70, namely a flange located between an upper outlet cavity and a lower outlet cavity, is arranged on a body of the movable rod 20. The movable rod drives the sealing element to reciprocate to switch water into different outlet passages 70.

On the basis of the above structure, the flow control part 30 is further arranged on the movable rod 20, and the movable rod 20 moves to the corresponding outlet passage 70 and controls the outlet passage 70 to discharge water. At this moment, the movable rod 20 rotates to drive the flow control part 30 to rotate to control the outlet flow in the corresponding outlet passage 70. The flow control part 30 comprises a control knob 32 circumferentially extending and protruding out of the movable rod 20, the circumferential surface of the control knob 32 faces and seals the corresponding outlet passage 70 and is formed with a notch 31, and water can flow into the outlet passage 70 on the other side via the notch 31.

Figure 2:
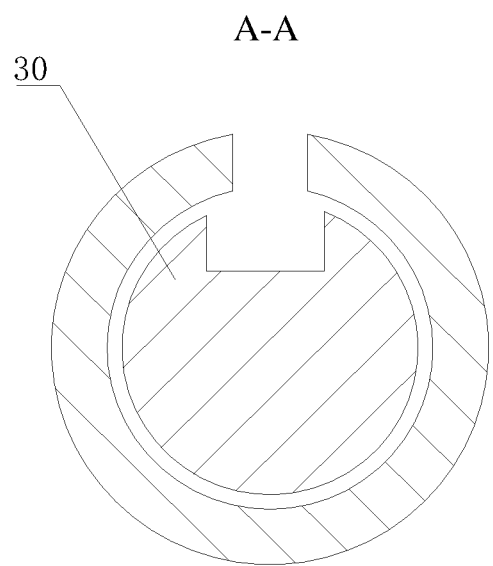
FIG. 2 is a sectional view along A-A in FIG. 1.

As shown in FIG. 1 and FIG. 2, when rotated, the movable rod 20 drives the control knob 32 to rotate to make the notch 31 face the outlet passage 70 on the other side to ensure normal circulation of water, and at this moment, the outlet flow in the outlet passage 70 is maximized.

Figure 3:
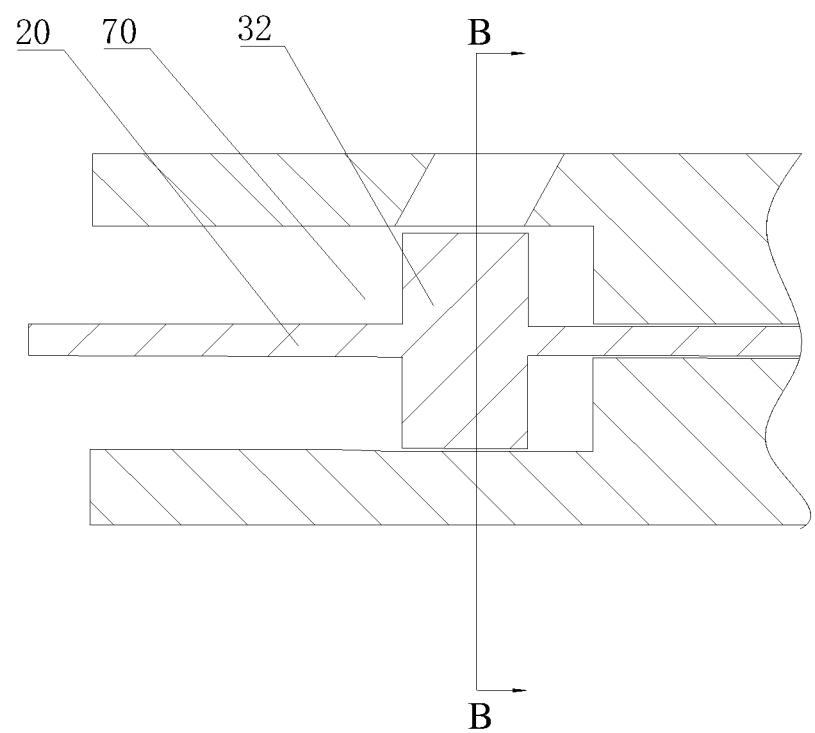
FIG. 3 is a structural view of the flow control device in the case of the minimum outlet flow in the outlet passage in Embodiment 1 of the invention.
Figure 4:
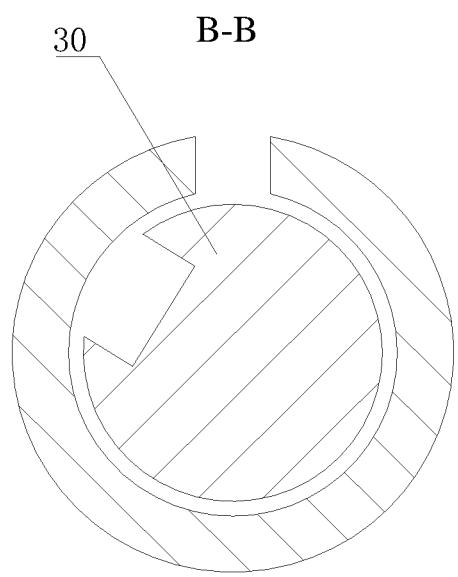
FIG. 4 is a sectional view along B-B in FIG. 3.

As shown in FIG. 3 and FIG. 4, when further rotated, the movable rod 20 drives the control knob 32 to rotate to gradually reduce the space between the notch 31 and the outlet passage 70 on the other side, the circumferential surface of the control knob 32 gradually seals the outlet passage 70, and the water flow in the outlet passage 70 decreases gradually until the circumferential surface of the control knob 32 completely seals the outlet passage 70, and at this moment, the outlet flow in the outlet passage 70 is minimized.

Embodiment 2

Figure 5:
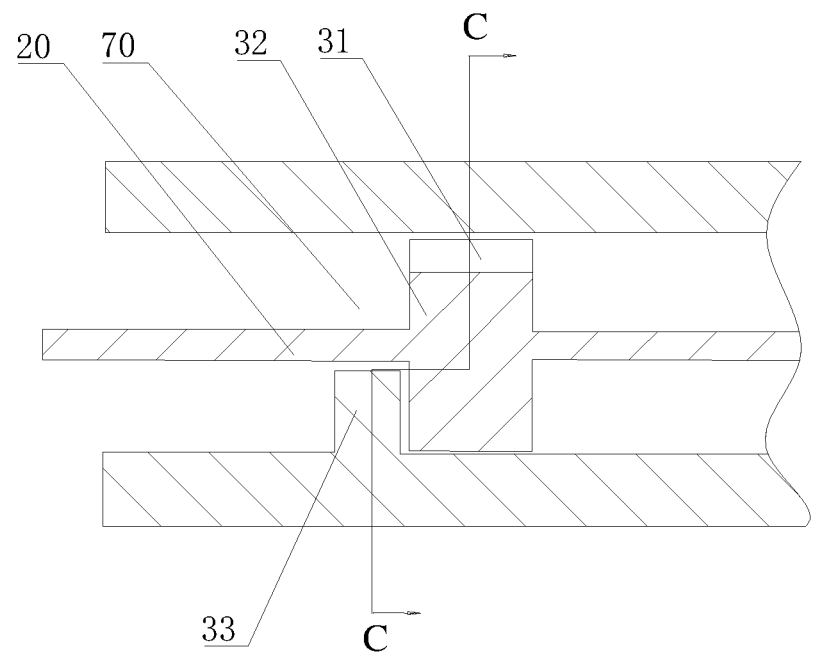
FIG. 5 is a structural view of a flow control device in the case of the maximum outlet flow in an outlet passage in Embodiment 2 of the invention.

As shown in FIG. 5, Embodiment 2 provides a flow control device which comprises a movable rod 20, a flow control part 30 and outlet passages 70.

The movable rod 20 is arranged in one outlet passage 70 and is able to move forwards or backwards and rotate in the outlet passage 70. The movable rod 20 may be the valve element mentioned the description of the related art, and a sealing element of the outlet passage 70, namely a flange between an upper outlet cavity and a lower outlet cavity, is arranged on a body of the movable rod 20. The movable rod 20 moves to drive the sealing element to reciprocate to switch water into different outlet passages 70.

On the basis of the above structure, the flow control part 30 is further arranged on the movable rod 20, and the movable rod 20 moves to the corresponding outlet passage 70 and controls the outlet passage 70 to discharge water. At this moment, the movable rod 20 rotates to drive the flow control part 30 to rotate to control the outlet flow in the outlet passage 70. The flow control part 30 comprises a control knob 32 circumferentially extending and protruding out of the movable rod 20, the circumferential surface of the control knob 32 faces and seals the corresponding outlet passage 70 and is formed with a notch 31, and water can flow into the outlet passage 70 on the other side via the notch 31. The outlet passage 70 is provided with a notch plug 33 located in front of the control knob 32, and the notch plug 33 seals part of the outlet passage 70 and the notch.

Figure 6:
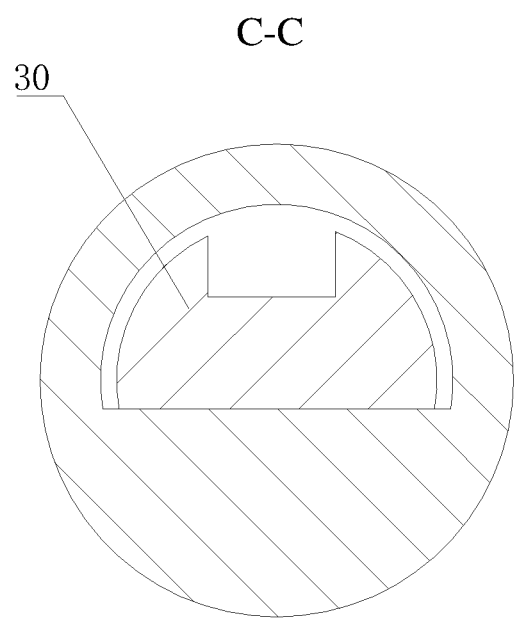
FIG. 6 is a sectional view along C-C in FIG. 5.

As shown in FIG. 5 and FIG. 6, when rotated, the movable rod 20 drives the control knob 32 to rotate to make the notch 31 away from the notch plug 33 and communicated with the outlet passage 70 on the other side to ensure normal circulation of water, and at this moment, the outlet flow in the outlet passage 70 is maximized.

Figure 7:
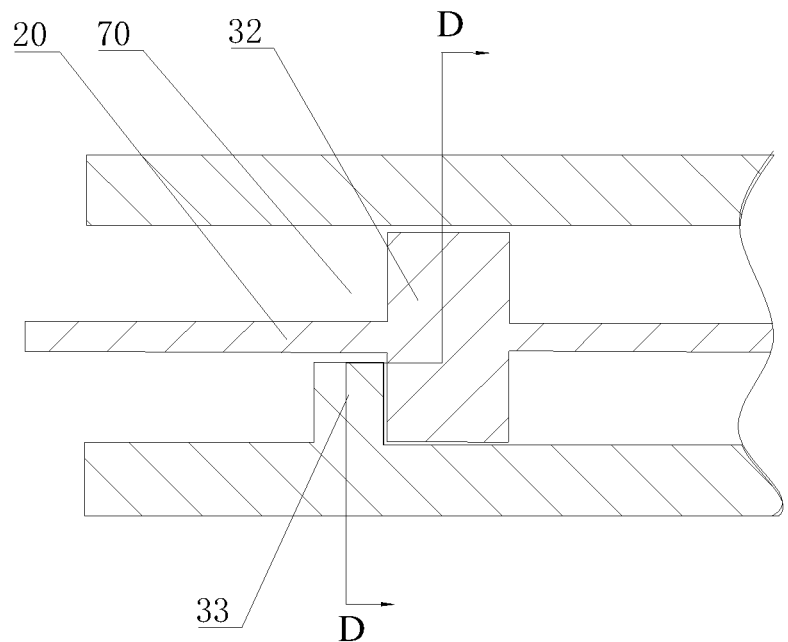
FIG. 7 is a structural view of the flow control device in the case of the minimum outlet flow in the outlet passage in Embodiment 2 of the invention.
Figure 8:
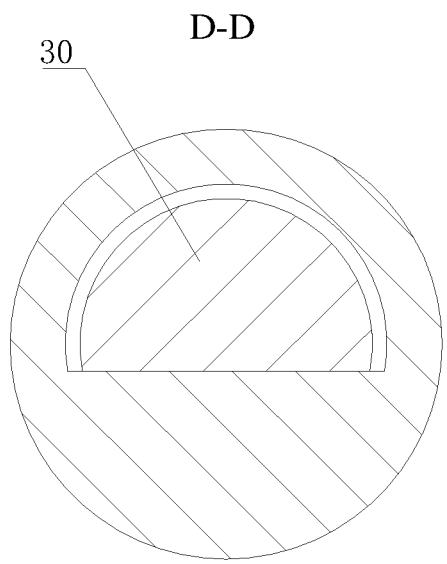
FIG. 8 is a sectional view along D-D in FIG. 7.

As shown in FIG. 7 and FIG. 8, when further rotated, the movable rod 20 drives the control knob 32 to rotate, the notch plug 33 gradually seals the notch 31, the communication space between the notch 31 and the outlet passage 70 on the other side becomes smaller, and the water flow in the outlet passage 70 decreases gradually unit the notch plug 33 completely seals the notch 31 and the circumferential surface of the control knob 32 seals the outlet passage 70, and at this moment, the outlet flow in the outlet passage 70 is minimized.

Embodiment 3

Figure 10:
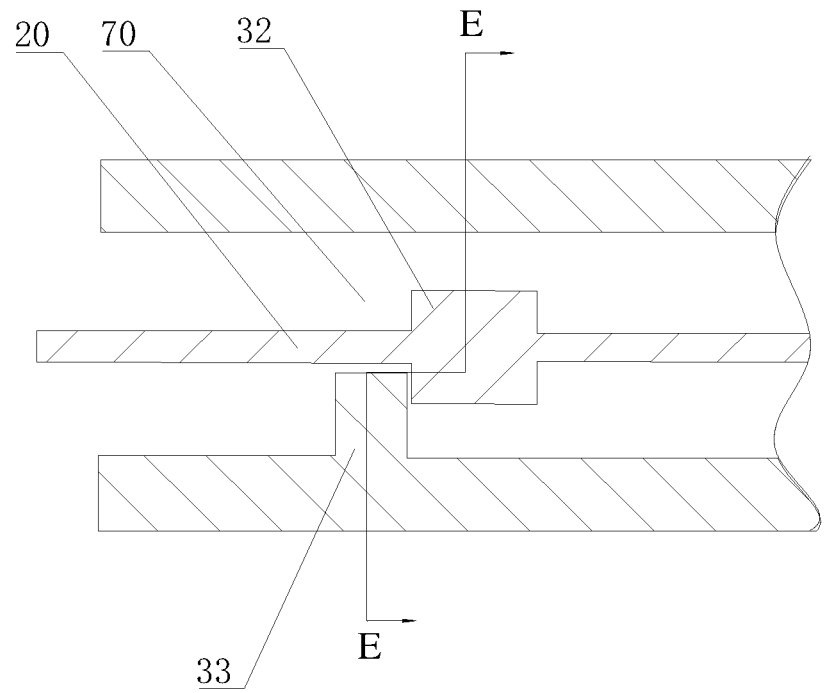
FIG. 10 is a structural view of a flow control device in the case of the maximum outlet flow in an outlet passage in Embodiment 3 of the invention.

As shown in FIG. 10, Embodiment 3 provides a flow control device which comprises a movable rod 20, a flow control part 30 and outlet passages 70.

The movable rod 20 is arranged in one outlet passage 70 and is able to move forwards or backwards and rotate in the outlet passage 70. The movable rod 20 may be the valve element mentioned the description of the related art, and a sealing element of the outlet passage 70, namely a flange between an upper outlet cavity and a lower outlet cavity, is arranged on a body of the movable rod 20. The movable rod 20 moves to drive the sealing element to reciprocate to switch water into different outlet passages 70.

Figure 9:
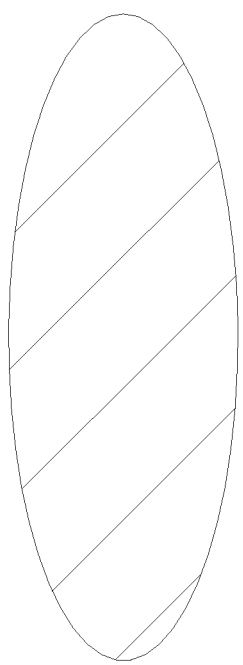
FIG. 9 is a sectional view of a control knob.

On the basis of the above structure, the flow control part 30 is further arranged on the movable rod 20, and the movable rod 20 moves to the corresponding outlet passage 70 and controls the outlet passage 70 to discharge water. At this moment, the movable rod 20 rotates to drive the flow control part 30 to rotate to control the outlet flow in the outlet passage 70. The flow control part 30 comprises a control knob 32 circumferentially extending and protruding out of the movable rod 20, and the circumferential surface of the control knob 32 faces the corresponding outlet passage 70. As shown in FIG. 9, the diameter of the control knob 32 decreases gradually in the circumferential direction to cover a perimeter corresponding to a central angle of 90°, and then increases gradually to cover a perimeter corresponding to a central angle of 90°. In this way, the control knob 32 has two narrow and long ends and two flat and wide ends. The narrow and long ends of the control knob 32 are used as sealing ends, and the flat and wide ends of the control knob 32 are used as circulating ends. Each outlet passage 70 is provided with a notch plug 33 in front of the control knob 32, and the notch plug 33 seals part of the outlet passage 70.

Figure 11:
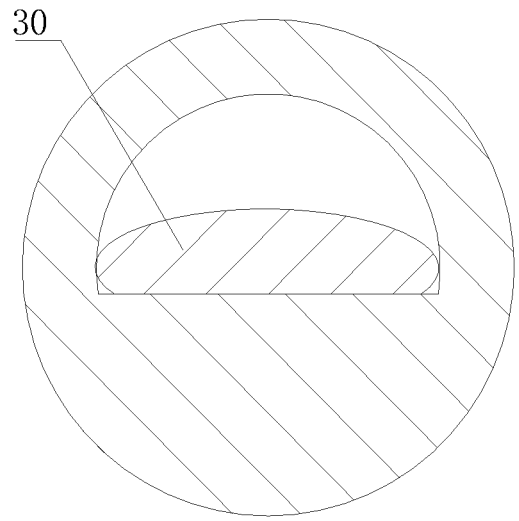
FIG. 11 is a sectional view along E-E in FIG. 10.

As shown in FIG. 10 and FIG. 11, when rotated, the movable rod 20 drives the control knob 32 to rotate to make the maximum diameters of the flat and wide ends parallel with the notch plug 33, at this moment, the area, sealed by the circumferential surface of the control knob 32 and the notch plug 33, of the outlet passage 70 is the smallest, and the outlet flow in the outlet passage 70 is maximized.

Figure 12:
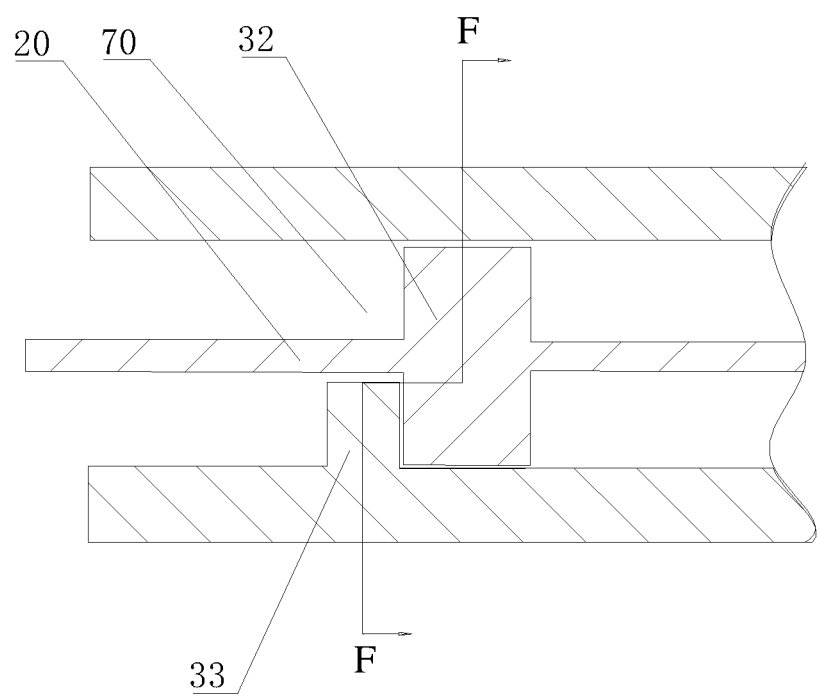
FIG. 12 is a structural view of the flow control device in the case of the minimum outlet flow in the outlet passage in Embodiment 3 of the invention.
Figure 13:
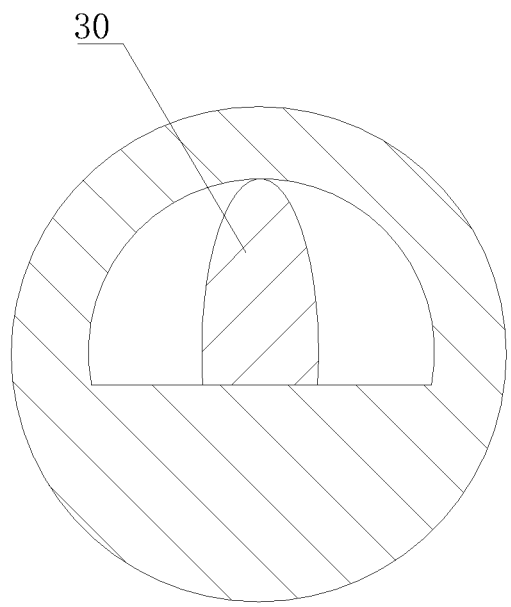
FIG. 13 is a sectional view along F-F in FIG. 12.

As shown in FIG. 12 and FIG. 13, when further rotated, the movable rod 20 drives the control knob 32 to rotate to enable the narrow and long ends to rotate slowly, so that the contact area between the narrow and long ends and the notch plug 33 is reduced, the area, sealed by the notch plug 33 and the circumferential surface of the control knob 32, of the outlet passage 70 becomes larger gradually, and the outlet flow in the outlet passage 70 decreases.

Because the sectional areas, sealed by different notch plugs 33, of the outlet passage 70 are different, in this embodiment, the control knob 32 rotates to different positions of the outlet passage 70 to realize the maximum outlet flow and the minimum outlet flow in the outlet passages 70, that is, the outlet flow in the outlet passage 70 only depends on the sectional area, sealed by the circumferential surface of the control knob 32 and the notch plug 33, of the outlet passage 70. Thus, in this embodiment, the positions corresponding to the maximum outlet flow and the minimum outlet flow are not constant.

Embodiment 4

Embodiment 4 provides a flow control device which comprises a movable rod 20, a flow control part 30 and outlet passages 70.

The movable rod 20 is arranged in one outlet passage 70 and is able to move forwards or backwards and rotate in the outlet passage 70. The movable rod 20 may be the valve element mentioned the description of the related art, and a sealing element of the outlet passage 70, namely a flange between an upper outlet cavity and a lower outlet cavity, is arranged on a body of the movable rod 20. The movable rod 20 moves to drive the sealing element to reciprocate to switch water into different outlet passages 70

On the basis of the above structure, the flow control part 30 is further arranged on the movable rod 20, and the movable rod 20 moves to the corresponding outlet passage 70 and controls the outlet passage 70 to discharge water. At this moment, the movable rod 20 rotates to drive the flow control part 30 to rotate to control the outlet flow in the outlet passage 70.

Figure 14:
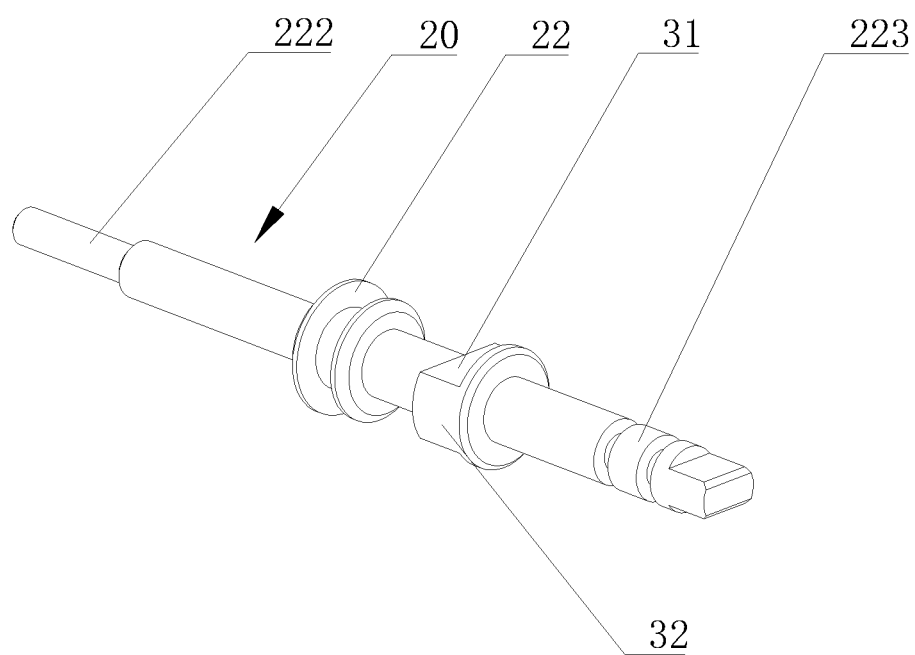
FIG. 14 is a structural view of a movable rod of a flow control device in Embodiment 4 of the invention.
Figure 15:
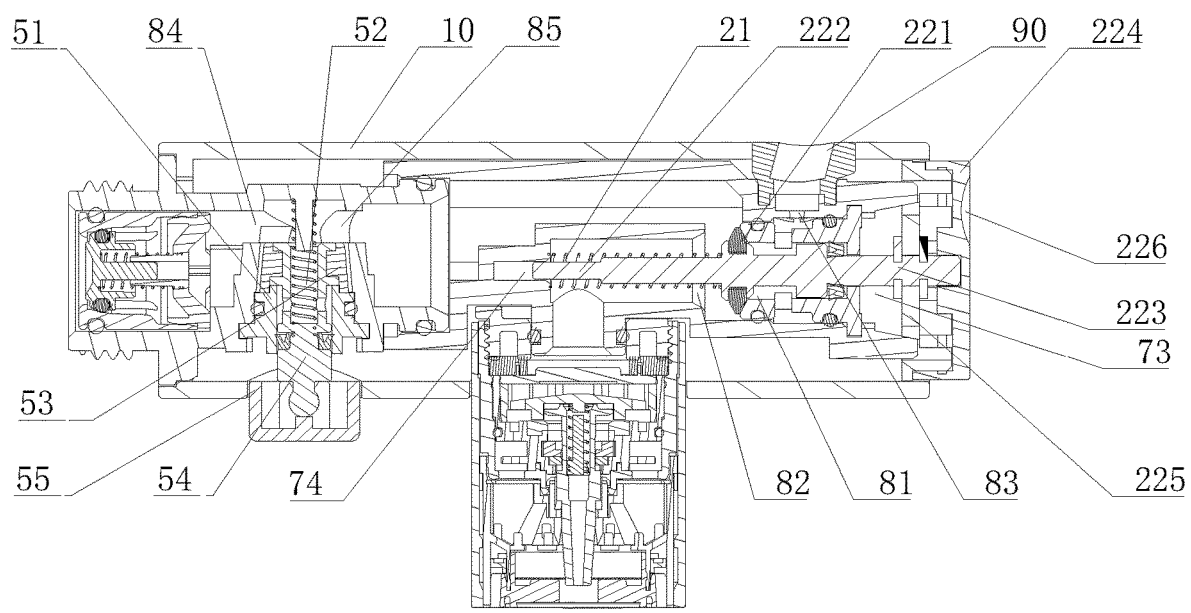
FIG. 15 is a structural view of the flow control device in Embodiment 4 of the invention.

As shown in FIG. 14 and FIG. 15, the flow control part 30 comprises a control knob 32 circumferentially extending and protruding out of the movable rod 20, the circumferential surface of the control knob 32 faces and seals the corresponding outlet passage 70 and is formed with notches 31, and water can flow into the outlet passage 70 on the other side via the notches 31. Two symmetrical notches 31 are formed in the control knob 32, and the axial section of each of the notches along the control knob 32 is of an L shape.

A switch knob 22 circumferentially extending and protruding out of the movable rod 20 is further arranged on the movable rod 20, and the switch knob 22 reciprocates to alternately seal different outlet passages 70. A groove surrounding the switch knob 22 in the axial direction is formed in the circumferential surface of the switch knob 22, and a sealing rubber ring 221 is arranged in the groove.

Figure 16:
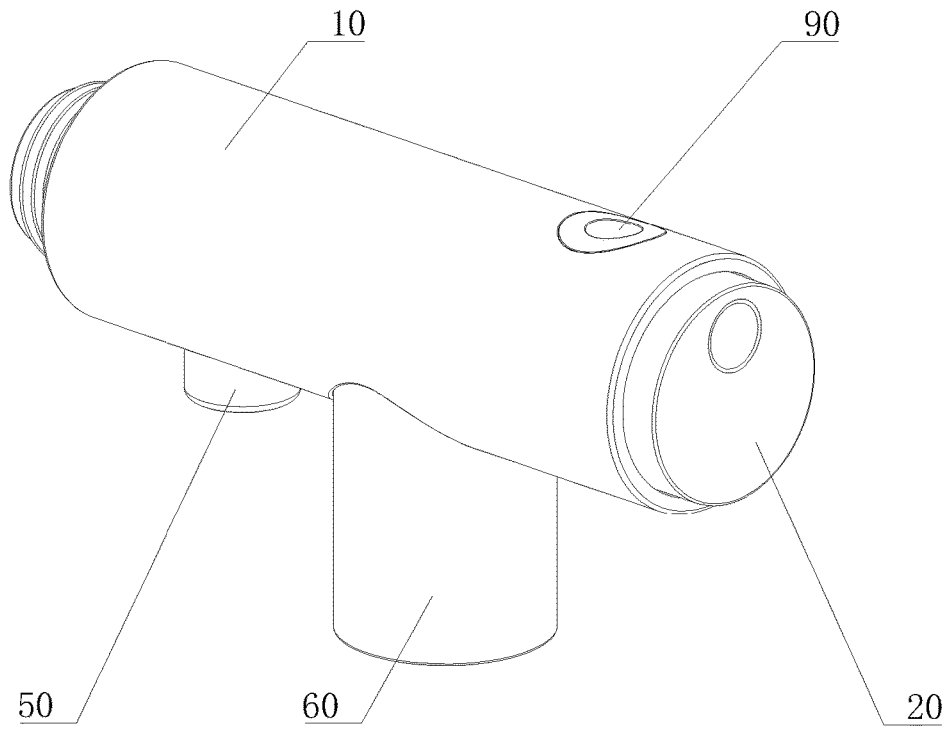
FIG. 16 is an external view of the flow control device in Embodiment 4 of the invention.
Figure 17:
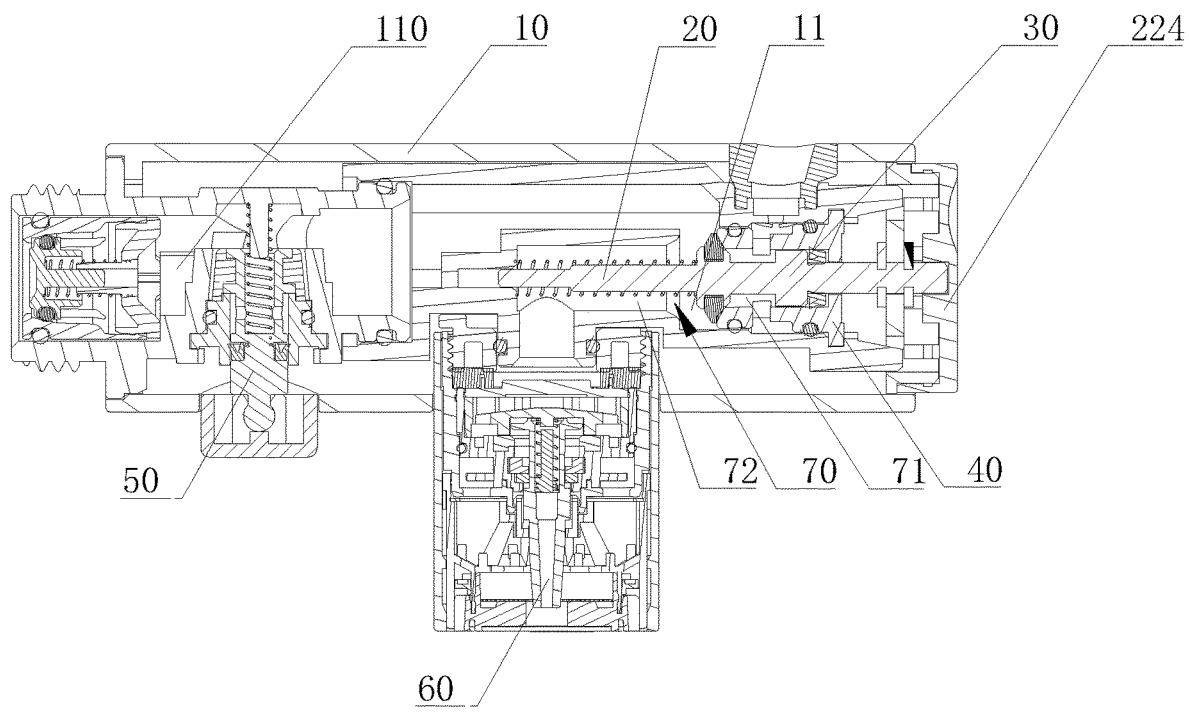
FIG. 17 is a structural view of the flow control device in the case where water is discharged through a second passage in Embodiment 4 of the invention.

As shown in FIG. 16 and FIG. 17, the flow control device further comprises a shell 10, the shell 10 is a hollow cylinder, one end of the shell 10 is connected to an inlet device through an inlet passage 110, and a press shell 224 is arranged at the other end of the shell 10. A division cavity 11 is formed in the shell 10, the inlet passage 110 is communicated with a first passage 71 and a second passage 72 through the division cavity 11, and a multifunctional aerator 60 is arranged at the tail end of the second passage 71 and can discharge needle-shaped water, bubble water, water mist or the like. An upward spray channel 90 opposite to the gravity direction is arranged at the tail end of the first passage 71.

A first passage inlet 81 communicated with the first passage 71 and a second passage inlet 82 communicated with the second passage 72 are formed in the division cavity 11 and are opposite to each other.

As shown in FIG. 14 and FIG. 15, the movable rod 20 comprises a switch spring 21. The movable rod 20 is cylindrical, one end of the movable rod 20 is a holding end 221, and the other end of the movable rod 20 is a press end 223. A switch knob 22 used for sealing the first passage inlet 81 or the second passage inlet 82 circumferentially extends and protrudes out of the middle of the movable rod 20. A first accommodating cavity 73 for accommodating the press end 223 is formed in an end, close to the first passage inlet 81, of the first passage 71; a second accommodating cavity 74 for accommodating the holding end 222 is formed in an end, close to the second passage inlet 82, of the second passage 72; the switch spring 21 is disposed around the holding end 222 of the movable rod 20, one end of the switch spring 21 abuts against the switch knob 22, and the other end of the switch spring abuts against the side wall of the second accommodating cavity 74.

The movable rod 20 further comprises the press shell 224 and a limiting disk 225. The press shell 224 is a circular lid and is fixedly connected to the press end 223, and a protrusion is arranged in the press shell 224; the limiting disk 225 is fixedly connected to the inner wall of the first accommodating cavity 73, an arc groove is formed in the limiting disk 225, and the protrusion stretches into the arc groove to limit the rotation position of the press shell 224.

A semispherical pit 226 is formed in the end of the press shell 224, and users can rotate and control the flow control part 30 by gently pressing the pit with a finger rather than holding the press shell 224.

Figure 18:
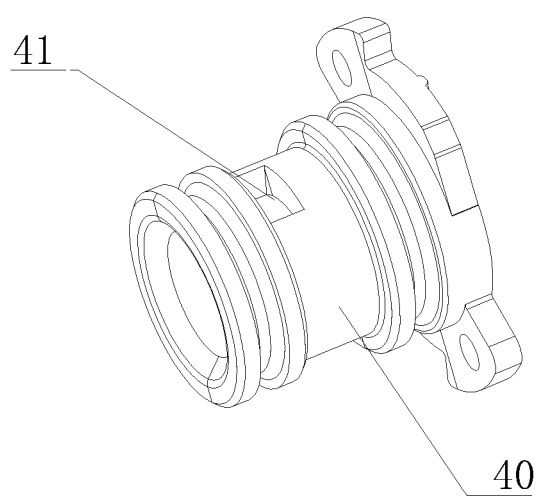
FIG. 18 is a structural view of a valve seat.

As shown in FIG. 15 and FIG. 18, an axial opening of the notch 31 of the control knob 32 faces the first passage inlet 81 to communicate the first accommodating cavity 73 with the spray channel 90; a valve seat 40 may be disposed around the flow control part 30 to fix the flow control part 30. The valve seat 40 is a hollow cylinder, and the end of the valve seat 40 is provided with a boss to be fixed and matched with a groove in the inner wall of the first accommodating cavity 73 and is provided with a sealing ring. A through hole 41 corresponding to the radial direction of a first outlet 83 is formed in the valve seat 40. When the flow control part 30 is provided with the valve seat 40, a gap between the control knob 32 and the through hole 41 can be controlled to control the outlet flow in the spray channel 90.

Figure 19:
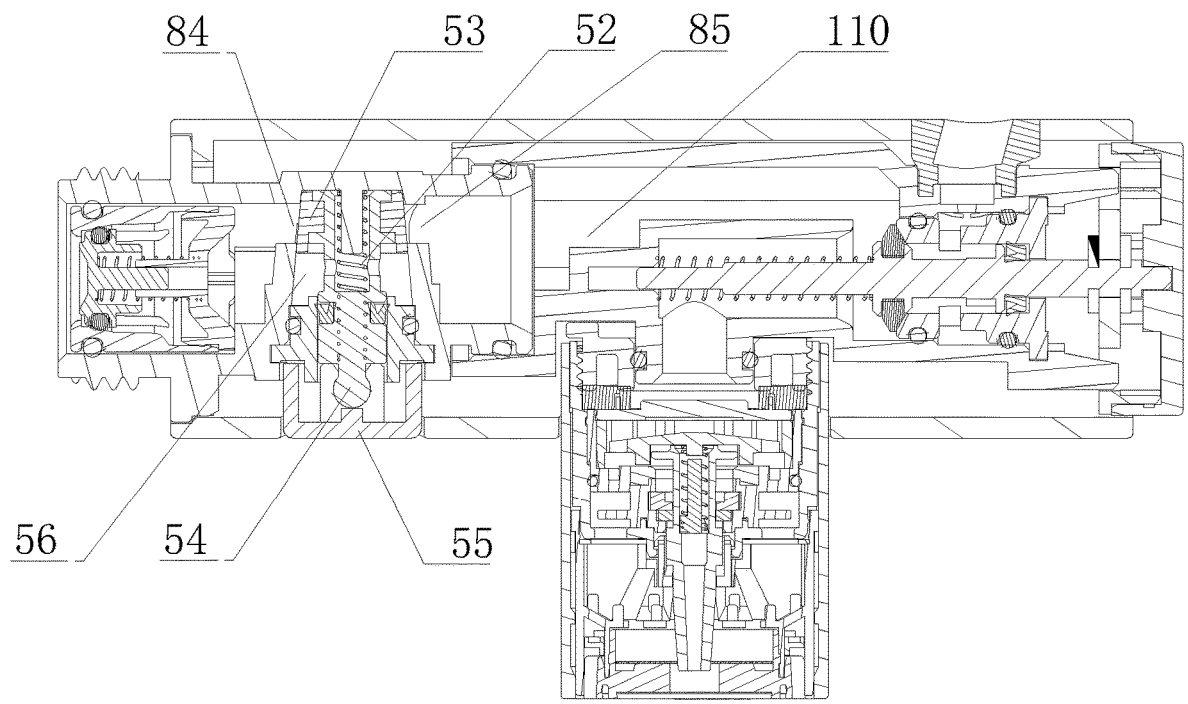
FIG. 19 is a structural view of a pause device of the flow control device in Embodiment 4 of the invention.

As shown in FIG. 17 and FIG. 19, a pause device 50 comprises a valve sleeve 51, a spring 52, a rubber waterproof block 53, a button shaft 54 and a button 55. The valve sleeve 51 is fixed through the cooperation of a hollow stepped cylinder and a groove in the inner wall of the valve cavity 56 perpendicular to the inlet passage 110 through a boss of the shell 10 of the valve sleeve 51, and is provided with a sealing ring, and the valve sleeve 51 is disposed around the button 55 shaft 54, is provided with a sealing ring and is used for fixing the position of the button shaft 54. The valve cavity 56 is formed with a pause inlet 84 and a pause outlet 85 used for communicating front and back inlet passages 110. One end of the spring 52 is disposed around a pillar at the top of the valve cavity 56, and the other end of the spring 52 is arranged in a groove in the bottom of the button shaft 54. The rubber waterproof block 53 is slidably arranged in the valve sleeve 51 and is disposed around the lower end of the button shaft 54. When the spring 52 is not compressed, the rubber waterproof block 53 is away from the pause inlet 84 and the pause outlet 85, and water can flow through the inlet passage 110. When the spring 52 is compressed, the rubber waterproof 53 seals the pause inlet 84 and the pause outlet 85 at the same time, and the inlet passage 110 is sealed. The button 55 is arranged at an end, away from the rubber waterproof block 53, of the button shaft 54.

The pause device 50 is a reset device. When the button 55 is pressed, the spring 52 is compressed, the rubber waterproof block 53 seals the pause inlet 84 and the pause outlet 85 at the same time, and the inlet passage 110 is sealed. At this moment, no water flows through the inlet passage 110, the switch spring 21 will not be compressed, the sealing rubber ring 221 seals the second passage 72, and the water outlet device discharges water via the first passage 71.

As shown in FIG. 17, during use, when the press shell 224 is not pressed, a channel between the inlet passage 110 and the first passage 71 is blocked by the sealing rubber ring 221 under the effect of the switch spring 21, the inlet passage 110 is communicated with the second passage 72, and water flows out of the inlet passage 110 along the second passage 72.

Figure 20:
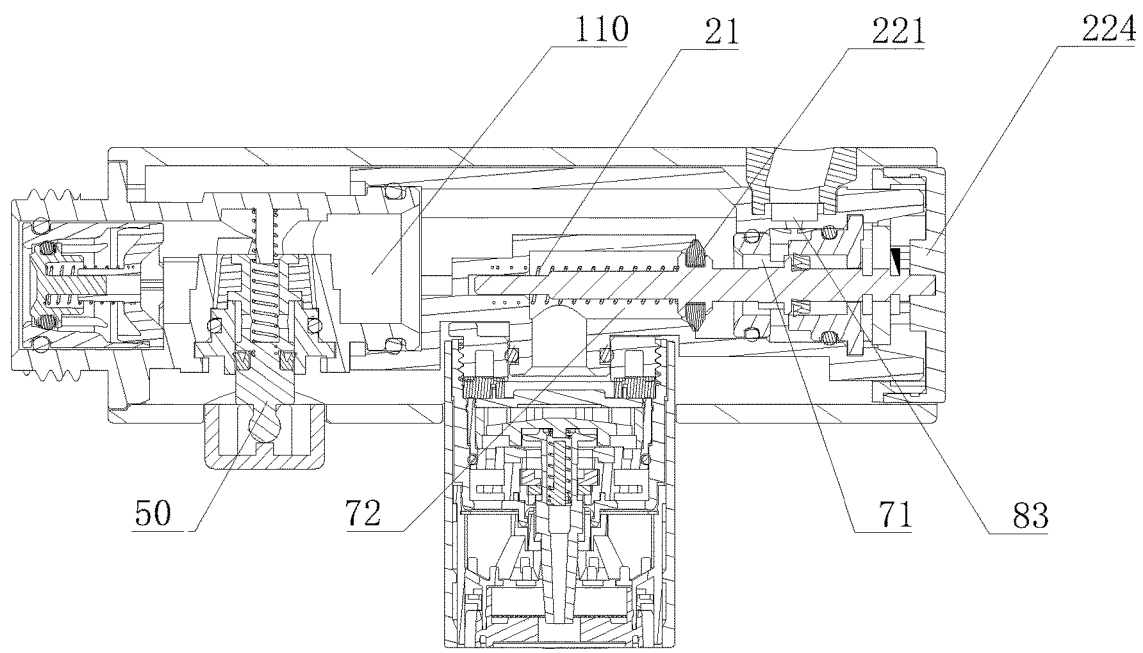
FIG. 20 is a structural view of the flow control device in the case where water is discharged through a first passage in Embodiment 4 of the invention.

As shown in FIG. 20, when the press shell 224 is pressed, the switch spring 21 is compressed, a channel between the inlet passage 110 and the second passage 72 is blocked by the sealing rubber ring 221, the inlet passage 110 is communicated with the first passage 71, and water flows out of the inlet passage 110 along the spray channel 90 of the first passage 71. The switch spring 21 is compressed under the effect of water.

Figure 21:
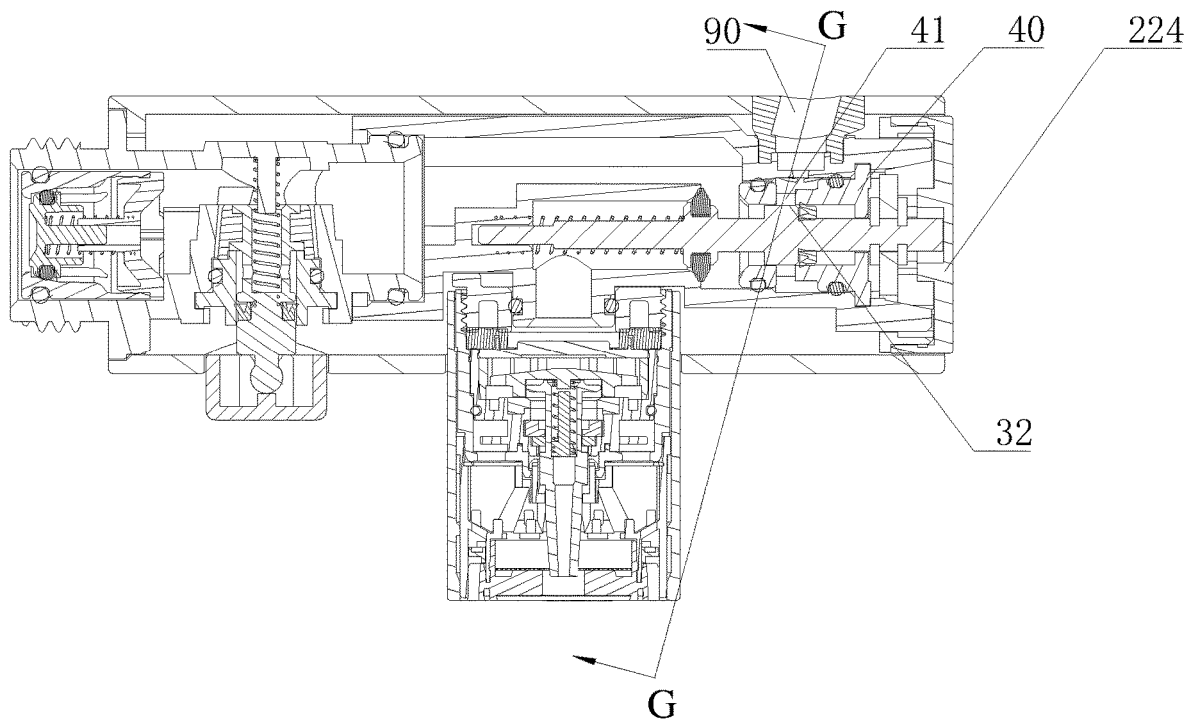
FIG. 21 is a structural view of the flow control device in the case of the minimum flow in the first passage in Embodiment 4 of the invention.
Figure 22:
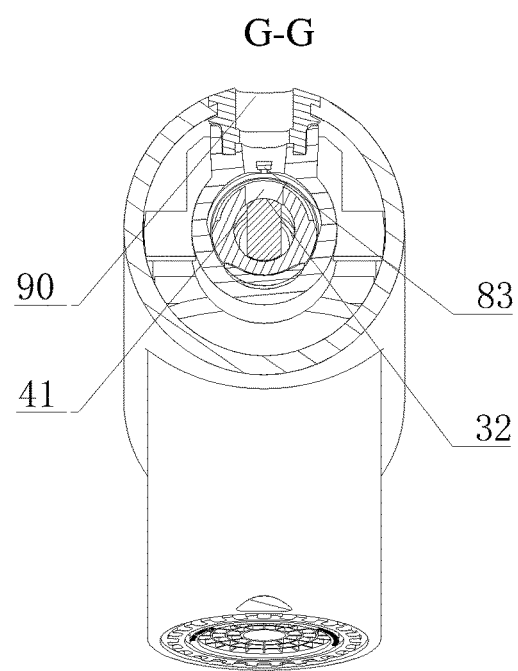
FIG. 22 is a sectional view along G-G in FIG. 21.
Figure 23:
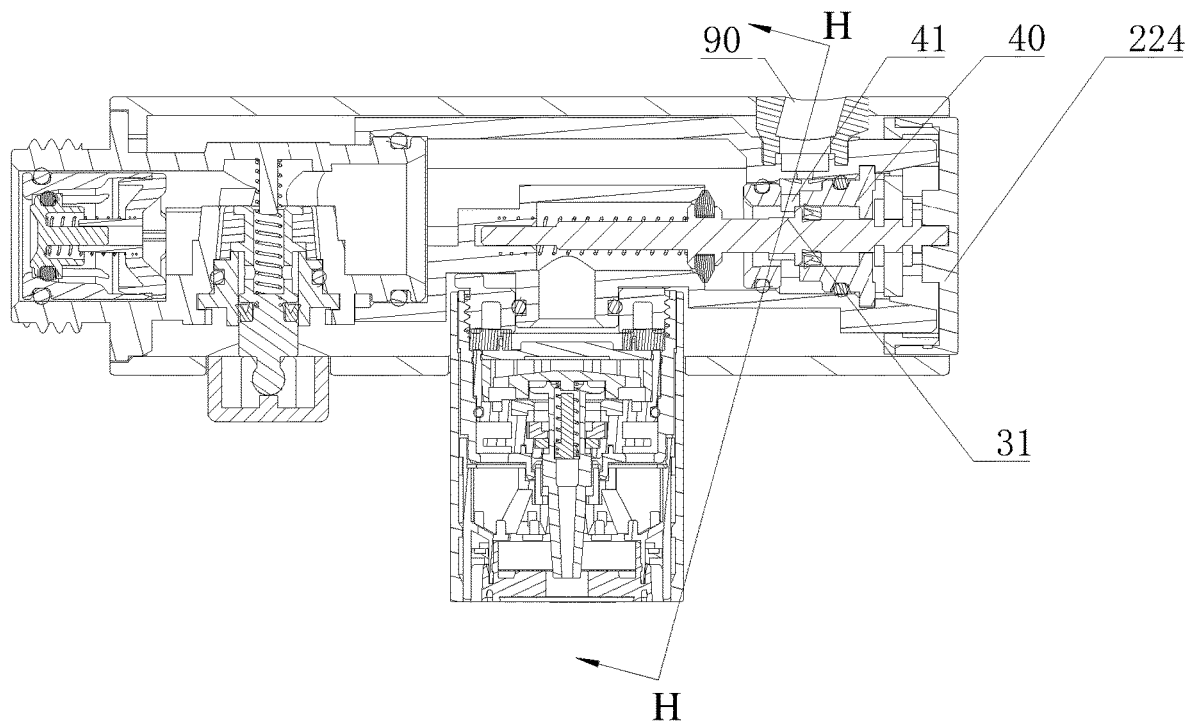
FIG. 23 is a structural view of the flow control device in the case of the maximum flow in the first passage in Embodiment 4 of the invention.
Figure 24:
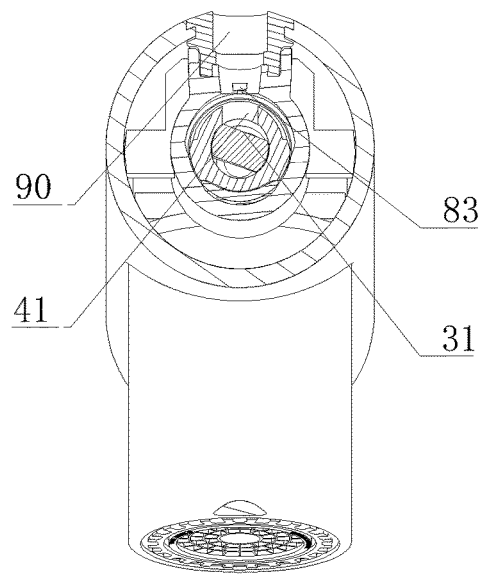
FIG. 24 is a sectional view along H-H in FIG. 23.

As shown in FIG. 21 and FIG. 22, the semispherical pit 226 of the press shell 224 is pressed with a finger and then rotated, the control knob 32 of the flow control part 30 rotates, the gap between the notch 31 and the first outlet 83 becomes smaller gradually, the contact area between a non-notch 31 part of the control knob 32 and the first outlet 83 is enlarged, the open area of the first outlet 83 is reduced, and the outlet flow in the spray channel 90 is decreased.

When the press shell 224 is rotated leftwards or rightwards to be limited, the gap between the notch 31 and the first outlet 83 is maximized or minimized, that is, the outlet flow in the spray channel 90 is maximized or minimized.

To sum up, the flow control device provided by the invention comprises the movable rod which is able to reciprocate to switch water into different outlet passages, the flow control part circumferentially extends and protrudes out of the movable rod, and the movable rod rotates to drive the flow control part to rotate to control the water flow in the outlet passages. During use, the movable rod is pressed to control the switching of the passages, and users can select the position where water is discharged as required, for example, water is discharged upwards or downwards. Moreover, the movable rod rotates to drive the flow control part to rotate to flexibly control the flow of a certain outlet, such as the upward outlet flow, to facilitate daily washing of the users.

The above description is merely used to explain the embodiments of the invention, and is not intended to limit the patent scope of the invention. All equivalent transformations made according to the contents of the description and the drawings, or direct or indirect applications to relating technical fields should also fall within the patent protection scope of the invention.

What is claimed is:

1. A flow control device, comprising a movable rod capable of reciprocating to switch water into different outlet passages, wherein a flow control part circumferentially extends and protrudes out of the movable rod, and the movable rod rotates to drive the flow control part to rotate to control a flow in a corresponding outlet passage;
wherein the movable rod comprises a switch knob circumferentially extending and protruding out of the movable rod, and the switch knob reciprocates to alternately seal different outlet passages.

2. The flow control device according to claim 1, wherein the flow control part comprises a control knob circumferentially extending and protruding out of the movable rod, and a circumferential surface of the control knob is formed with a notch and faces and seals the corresponding outlet passage.

3. The flow control device according to claim 2, wherein a diameter of the control knob decreases gradually in a circumferential direction to cover a perimeter corresponding to a central angle of 90° and then increases gradually to cover a perimeter corresponding to a central angle of 90°.

4. The flow control device according to claim 2, wherein two notches are symmetrically formed in the control knob, and a section of each said notch in an axial direction of the control knob is of an L shape.

5. The flow control device according to claim 1, wherein the flow control part comprises a control knob circumferentially extending and protruding out of the movable rod, a circumferential surface of the control knob is formed with a notch and faces and seals the corresponding outlet passage, and a notch plug is arranged on a side wall of each said outlet passage.

6. The flow control device according to claim 5, wherein a diameter of the control knob decreases gradually in a circumferential direction to cover a perimeter corresponding to a central angle of 90° and then increases gradually to cover a perimeter corresponding to a central angle of 90°.

7. The flow control device according to claim 1, wherein a groove surrounding the switch knob in an axial direction is formed in a circumferential surface of the switch knob, and a sealing rubber ring is arranged in the groove.

8. The flow control device according to claim 7, further comprising an inlet passage and a division cavity, wherein the outlet passages include a first passage and a second passage, and the inlet passage is communicated with the first passage and the second passage through the division cavity;
   a first passage inlet communicated with the first passage and a second passage inlet communicated with the second passage are formed in the division cavity and are opposite to each other;
   the flow control device further comprises a switch spring, and the switch knob is arranged in a middle of the movable rod;
   one end of the movable rod is a press end, and another end of the movable rod is a holding end; a first accommodating cavity for accommodating the press end is formed in an end, close to the first passage inlet, of the first passage; a second accommodating cavity for accommodating the holding end is formed in an end, close to the second passage inlet, of the second passage;
   the switch spring is disposed around the holding end of the movable rod, one end of the switch spring abuts against the switch knob, and another end of the switch spring abuts against a side wall of the second accommodating cavity.

9. The flow control device according to claim 8, wherein the first passage comprises an upward water spray channel opposite to a gravity direction.

10. The flow control device according to claim 8, wherein a multifunctional aerator is arranged at a tail end of the second passage.

11. The flow control device according to claim 1, further comprising an inlet passage and a division cavity, wherein the outlet passages include a first passage and a second passage, and the inlet passage is communicated with the first passage and the second passage through the division cavity;
   a first passage inlet communicated with the first passage and a second passage inlet communicated with the second passage are formed in the division cavity and are opposite to each other;
   the flow control device further comprises a switch spring, and the switch knob is arranged in a middle of the movable rod;
   one end of the movable rod is a press end, and another end of the movable rod is a holding end; a first accommodating cavity for accommodating the press end is formed in an end, close to the first passage inlet, of the first passage; a second accommodating cavity for accommodating the holding end is formed in an end, close to the second passage inlet, of the second passage;
   the switch spring is disposed around the holding end of the movable rod, one end of the switch spring abuts against the switch knob, and another end of the switch spring abuts against a side wall of the second accommodating cavity.

12. The flow control device according to claim 11, wherein the first passage comprises an upward water spray channel opposite to a gravity direction.

13. The flow control device according to claim 11, wherein a multifunctional aerator is arranged at a tail end of the second passage.

* * * * *